US012624740B2

(12) United States Patent
Kim et al.

(10) Patent No.: US 12,624,740 B2
(45) Date of Patent: May 12, 2026

(54) FREQUENCY SENSITIVE SHOCK ABSORBER

(71) Applicant: HL MANDO CORPORATION, Pyeongtaek-si (KR)

(72) Inventors: Kyudo Kim, Seoul (KR); Dong Won Kang, Yongin-si (KR); Kwang Duk Baek, Yongin-si (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 715 days.

(21) Appl. No.: 17/947,645

(22) Filed: Sep. 19, 2022

(65) Prior Publication Data

US 2023/0101911 A1 Mar. 30, 2023

(30) Foreign Application Priority Data

Sep. 30, 2021 (KR) ........................ 10-2021-0130259

(51) Int. Cl.
| | |
|---|---|
| *F16F 9/512* | (2006.01) |
| *F16F 9/18* | (2006.01) |
| *F16F 9/32* | (2006.01) |
| *F16F 9/348* | (2006.01) |
| *F16F 9/516* | (2006.01) |

(52) U.S. Cl.
CPC ............ *F16F 9/5126* (2013.01); *F16F 9/182* (2013.01); *F16F 9/3221* (2013.01); *F16F 9/3484* (2013.01); *F16F 9/516* (2013.01); *F16F 2222/12* (2013.01); *F16F 2228/04* (2013.01); *F16F 2228/066* (2013.01); *F16F 2230/183* (2013.01); *F16F 2230/36* (2013.01);

(Continued)

(58) Field of Classification Search
CPC ................................ F16F 9/5126; F16F 9/182
See application file for complete search history.

(56) References Cited

U.S. PATENT DOCUMENTS

| | | | |
|---|---|---|---|
| 11,680,622 B2 | 6/2023 | Kim et al. | |
| 2005/0056501 A1* | 3/2005 | de Molina | .............. F16F 9/348 |
| | | | 188/322.15 |

(Continued)

FOREIGN PATENT DOCUMENTS

| | | |
|---|---|---|
| DE | 10 2004 014 395 A1 | 11/2004 |
| DE | 10 2006 044 557 A1 | 4/2007 |

(Continued)

OTHER PUBLICATIONS

Office Action dated Jan. 6, 2025, for corresponding German Patent Application No. 10 2022 124 827.5, along with an English translation (14 pages).

*Primary Examiner* — Melody M Burch

(74) *Attorney, Agent, or Firm* — Hauptman Ham, LLP

(57) ABSTRACT

The present disclosure relates to a frequency sensitive shock absorber, and the frequency sensitive shock absorber includes a piston rod coupled so that one side is located inside a cylinder and the other side is located outside the cylinder, a main valve coupled to the piston rod and partitioning an inner space of the cylinder into a compression chamber and a tension chamber, a sub-piston rod coupled to one side of the piston rod and interlocked with the piston rod to reciprocate along a longitudinal direction of the cylinder, and a sub-valve module coupled to the sub-piston rod and generating a damping force according to a frequency during a tension stroke.

12 Claims, 8 Drawing Sheets

(52) U.S. Cl.
    CPC ....... *F16F 2230/42* (2013.01); *F16F 2232/08*
                (2013.01); *F16F 2234/02* (2013.01)

(56) References Cited

U.S. PATENT DOCUMENTS

| | | | |
|---|---|---|---|
| 2013/0020158 A1 * | 1/2013 | Park | F16F 9/34 |
| | | | 188/280 |
| 2015/0152936 A1 * | 6/2015 | Kim | F16F 9/5126 |
| | | | 188/313 |

FOREIGN PATENT DOCUMENTS

| | | | | |
|---|---|---|---|---|
| DE | 10 2008 009 543 B3 | 7/2009 | | |
| DE | 11 2012 004 968 T5 | 8/2014 | | |
| DE | 11 2016 000 514 T5 | 3/2018 | | |
| DE | 11 2018 001 265 T5 | 11/2019 | | |
| JP | 2017187110 A | * 10/2017 | ............... | F16F 9/32 |
| WO | WO-2017013960 A1 | * 1/2017 | ............... | F16F 9/32 |

* cited by examiner

420

FREQUENCY SENSITIVE SHOCK ABSORBER

CROSS-REFERENCE TO RELATED APPLICATION

This application claims priority under 35 U.S.C. § 119 to Korean Patent Application No. 10-2021-0130259, filed on Sep. 30, 2021, in the Korean Intellectual Property Office (KIPO), the disclosure of which is incorporated by reference herein in its entirety.

TECHNICAL FIELD

The present disclosure relates to a frequency sensitive shock absorber, and more particularly, to a frequency sensitive shock absorber that can control a damping force for high and low frequencies during the tension stroke of the shock absorber.

BACKGROUND

In general, shock absorbers are installed in transportation means such as automobiles to absorb and buffer vibrations or shocks received from a road surface during traveling to improve riding comfort.

The shock absorber is activated when the vehicle vibrates according to a road surface condition. In this case, the damping force generated by the shock absorber varies according to an operating speed of the shock absorber.

It is very important to control damping force characteristics of the shock absorber when designing the vehicle because the ride comfort and driving stability of the vehicle can be controlled depending on how the damping force characteristics generated by the shock absorber are adjusted.

In general, a shock absorber includes a cylinder, a piston rod installed to compress and extend within the cylinder, and a piston valve coupled to the piston rod to control a flow of a working fluid. The cylinder and piston rod are coupled to a body or to a wheel or axle, respectively.

The piston valve is designed to have a constant damping characteristic at high speed, medium speed and low speed using a single flow path. Therefore, when it is required to improve riding comfort by lowering the low-speed damping force, it can affect even the high-speed damping force. In addition, the conventional shock absorber has a structure in which the damping force changes according to the change in a speed of the piston regardless of the frequency or stroke.

Therefore, the damping force that is changed according to the change in the speed of the piston generates the same damping force in various road surface conditions, and thus, there is a problem in that it is difficult to satisfy both riding comfort and adjustment stability.

Therefore, it is necessary to research and develop the valve structure of the shock absorber capable of satisfying the ride comfort and control stability of the vehicle at the same time so that the damping force can be varied according to various road surface conditions.

SUMMARY

The present disclosure is to provide a frequency sensitive shock absorber that can control a damping force for high and low frequencies respectively during a tension stroke of the shock absorber.

According to an aspect of the present disclosure, there is provided a frequency sensitive shock absorber including: a piston rod coupled so that one side is located inside a cylinder and the other side is located outside the cylinder; a main valve coupled to the piston rod and partitioning an inner space of the cylinder into a compression chamber and a tension chamber; a sub-piston rod coupled to one side of the piston rod and interlocked with the piston rod to reciprocate along a longitudinal direction of the cylinder; and a sub-valve module coupled to the sub-piston rod and generating a damping force according to a frequency during a tension stroke, in which the sub piston rod includes a working fluid discharge path formed to communicate with an inside of the sub-valve module to discharge a working fluid to adjust a pressure inside the sub-valve module when the pressure inside the sub-valve module increases due to the working fluid flowing into the sub-valve module during the tension stroke at low frequency.

The sub piston rod may include a head portion coupled to one side of the piston rod and a rod body portion extending along a longitudinal direction from a lower surface of the head portion and having a size of a cross section crossing the longitudinal direction formed smaller than a size of a cross section crossing the longitudinal direction of the head portion.

A rod insertion groove may be formed in the head portion by a set depth from an upper surface to the lower surface so that one side of the piston rod is inserted into the head portion.

The working fluid discharge path may include a first discharge path formed on the lower surface of the head portion and concavely formed to an outer peripheral surface of the rod body portion in a radial direction toward the rod body portion on an outside of the head portion, and a second discharge path formed on the outer circumferential surface of the rod body portion and formed by a set length along the longitudinal direction on the outer circumferential surface of the rod body.

A first fluid flow path through which the working fluid filling the inner space of the cylinder is introduced, flowed and discharged is formed when compression and tension strokes are performed along the longitudinal direction of the cylinder may be formed inside the piston rod.

A second fluid flow path through which the working fluid delivered from the piston rod is introduced, flowed, and discharged may be formed inside the sub-piston rod.

The sub-valve module may include a housing coupled to the rod body portion and having pilot chambers formed at upper and lower sides to be filled with the working fluid introduced through the second fluid flow path, a retainer located at a lower side of the housing, coupled to the rod body portion, and having a main chamber to be filled with the working fluid introduced through the second fluid flow path, a first pilot valve located between the housing and the retainer, coupled to the rod body portion, and partitioning the pilot chamber and the main chamber, and a second pilot valve located between the head portion and the housing, coupled to the rod body portion, and elastically deformed according to a pressure change in the pilot chamber.

The sub-valve module may further include an inlet disk coupled to the rod body portion to be located between the housing and the first pilot valve and having one or a plurality of first slits for causing the second fluid flow path and the pilot chamber to communicate with each other.

The housing may include one surface in which a first hollow penetrating along the longitudinal direction is formed so that the rod body portion penetrates, a first outer wall protruding upward and downward from an edge of the one surface and extending in the circumferential direction, and a first inner wall extending to protrude upward and downward at a position spaced apart along the radial direction from the first hollow on the one surface.

A separation space may be formed between the sub-piston rod and the upper first inner wall when the housing is coupled to the sub-piston rod.

The sub-valve module may further include an outlet disk coupled to the rod body portion to be located between the housing and the second pilot valve and having one or a plurality of second slits for causing the working fluid discharge path, the separation space, and the upper pilot chamber to communicate with each other.

A second hollow through which the sub-piston rod passes may be formed in the retainer, the retainer may include an outer wall protruding upwardly from an edge of one surface facing the housing and extending in a circumferential direction, and an inner wall formed to protrude by a set angle along the circumferential direction of the second hollow at a position spaced apart from the second hollow in the radial direction on one surface facing the housing, and the main chamber may be formed between the outer wall and the inner wall.

The retainer may further include a plurality of protrusions formed to be spaced apart by a set angle along the circumferential direction on the one surface to be located inside the main chamber.

A flow path may be formed between the adjacent inner wall and the inner wall so that the working fluid is introduced into the main chamber.

The details of other embodiments are included in the detailed description and drawings.

The frequency sensitive shock absorber according to the present disclosure has the following effects.

First, the pressure inside the sub-valve module, specifically in the pilot chamber, can be easily adjusted by discharging the working fluid through the working fluid discharge path formed on the sub-piston rod during a low-frequency tension stroke. In particular, while maintaining the number of slits formed in the outlet disk, only by discharging the working fluid through the working fluid discharge path, an effect corresponding to the control of the pressure by an area control by the slit can be expected.

Second, while the pressure in the pilot chamber is easily controlled, the durability of the sub-valve module is improved, and durability of the frequency sensitive shock absorber is improved as durability of the sub-valve module is improved, and thus, a lifespan is expected to be extended.

DETAILED DESCRIPTION

Figure 1:
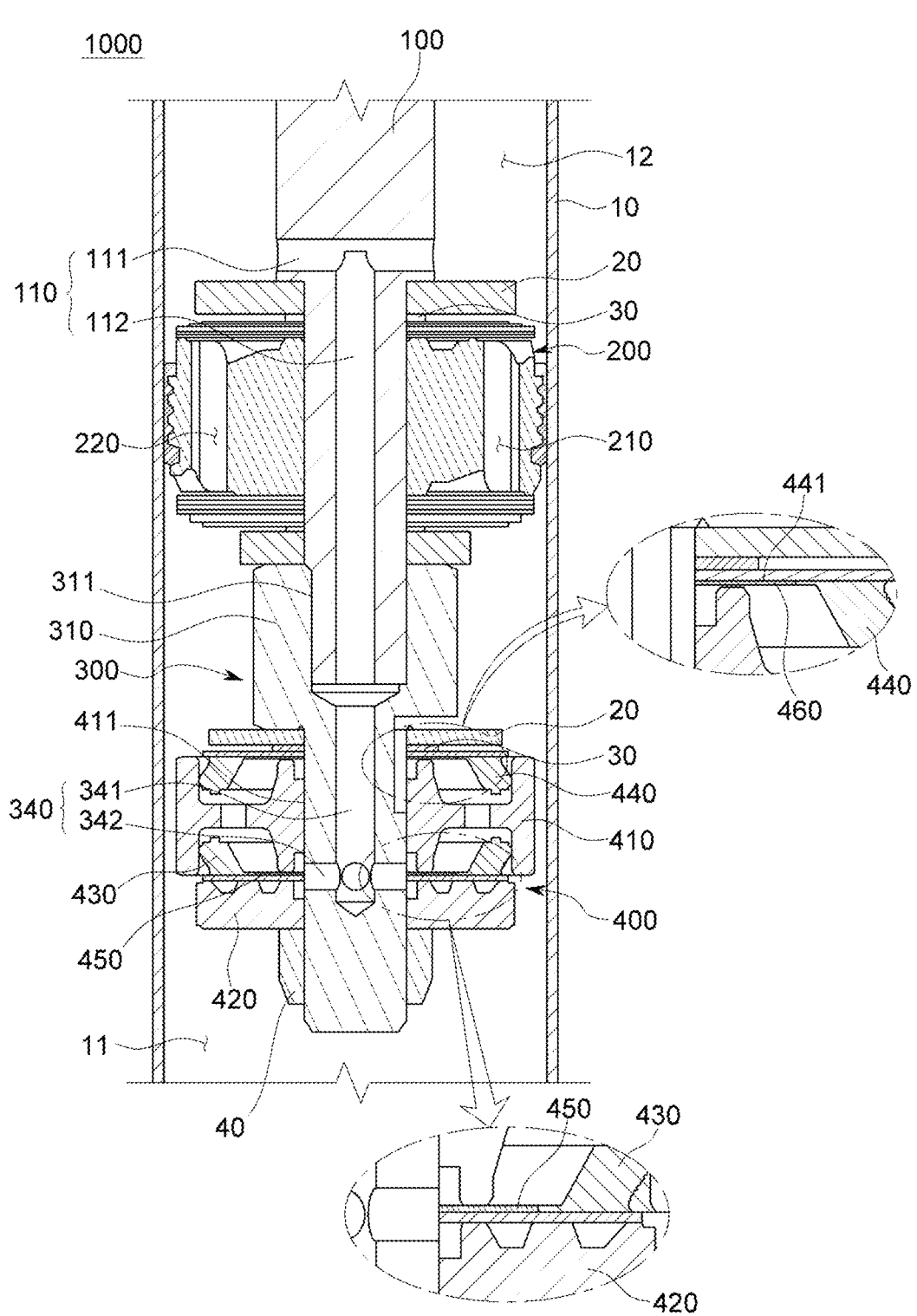
FIG. 1 is a cross-sectional view illustrating a frequency sensitive shock absorber according to one embodiment of the present disclosure.

Hereinafter, with reference to the accompanying drawings, embodiments of the present disclosure will be described in detail so that those of ordinary skill in the art to which the present disclosure pertains can easily implement them. The present disclosure may be embodied in many different forms and is not limited to the embodiments described herein.

It is noted that the drawings are schematic and not drawn to scale. Relative dimensions and proportions of parts in the drawings are illustrated exaggerated or reduced in size for clarity and convenience in the drawings, and any dimensions are illustrative only and not limiting. Moreover, the same reference numerals are used to indicate like features to the same structural element or part appearing in two or more drawings.

The embodiment of the present disclosure specifically represents an ideal embodiment of the present disclosure. As a result, various modifications of the diagram are expected. Accordingly, the embodiment is not limited to a specific shape of the illustrated area, and includes, for example, a shape modification by manufacturing.

Hereinafter, a frequency sensitive shock absorber according to the present disclosure will be described with reference to FIGS. 1 to 8.

A frequency sensitive shock absorber 1000 according to one embodiment of the present disclosure includes a cylinder 10, a piston rod 100, a main valve 200, a sub-piston rod 300, and a sub-valve module 400.

The cylinder 10 is formed in a cylindrical shape forming an inner space. The inner space of the cylinder 10 is filled with a working fluid. The inner space of the cylinder 10 is divided into a compression chamber 11 and a tension chamber 12 by the main valve 200.

One side of the piston rod 100 is inserted into the cylinder 10, and the other side is located outside the cylinder 10. The other side of the piston rod 100 located outside the cylinder 10 is connected to a body side or a wheel side of a vehicle. The piston rod 100 coupled to the cylinder 10 reciprocates along a longitudinal direction of the cylinder 10, and thus, compression and tension strokes are performed.

A first fluid flow path 110 through which the working fluid filled in the inner space of the cylinder 10 can be introduced, flowed and discharged is formed in the piston rod 100. Specifically, as illustrated in FIG. 1, the first fluid flow path 110 includes a first transverse fluid flow path 111 and a first longitudinal fluid flow path 112.

The first transverse fluid flow path 111 is formed at a position spaced apart by a set distance from one side of the piston rod 100. The first transverse fluid flow path 111 is formed passing through the piston rod 100 in a direction crossing the longitudinal direction of the piston rod 100. The first longitudinal fluid flow path 112 is connected so that one side is communicated with the first transverse fluid flow path 111 and penetrates to the one side of the piston rod 110 along the longitudinal direction of the piston rod 100.

The working fluid filling the cylinder 10 is introduced through the first transverse fluid flow path 111 when the piston rod 100 performs a tension stroke, flows along the first longitudinal fluid flow path 112, and is discharged.

The main valve 200 is coupled to the piston rod 100. Specifically, the piston rod 100 passes through the main valve 200 so that the piston rod 100 and the main valve 200 are coupled to each other. The main valve 200 coupled to the piston rod 100 divides the inner space of the cylinder 10 into the compression chamber 11 and the tension chamber 12.

A part of the working fluid filling the inner space of the cylinder 10 is stored in the compression chamber 11, and the remaining part of the working fluid is stored in the tension chamber 12.

The main valve 200 reciprocates inside the cylinder 10 according to compression and tension stroke together with the piston rod 100. When the main valve 200 reciprocates inside the cylinder 10, the working fluid stored in the compression chamber 11 flows into the tension chamber 12, and the working fluid stored in the tension chamber 12 flows into the compression chamber 11.

The main valve 200 has a compression flow path 210 and a tension flow path 220 penetrating along the longitudinal direction of the main valve 200 for the flow of the working fluid. In this way, the main valve 200 generates a damping force by the resistive force of the working fluid while reciprocating in the compression and tension strokes directions inside the cylinder 10.

More specifically, when the main valve 200 performs a compression stroke, the pressure in the compression chamber 11 on the lower side rises compared to the tension chamber 12 on the upper side. In this process, the working fluid filled in the compression chamber 11 passes through the compression flow path 210 of the main valve 200, opens the main valve 200, and flows into the tension chamber 12, and thus, the damping force is generated.

Conversely, when the main valve 200 performs the tension stroke, the pressure of the tension chamber 12 on the upper side rises compared to the compression chamber 11 on the lower side. In this process, the working fluid filled in the tension chamber 12 passes through the tension flow path 220 of the main valve 200, opens the main valve 200, and flows into the compression chamber 11, and thus, a damping force is generated.

The sub-piston rod 300 is coupled to one side (lower side) of the piston rod 100 and is provided inside the cylinder 10. The sub-piston rod 300 is linked to the movement of the piston rod 100. The sub-valve module 400 is coupled to the sub-piston rod 300, and due to the working fluid flowing into the sub-valve module 400 during a low-frequency tension stroke, the pressure inside the sub-valve module 400 increases, a working fluid discharge path 330 is formed to discharge the working fluid in order to adjust the pressure inside the sub-valve module.

Figure 2:
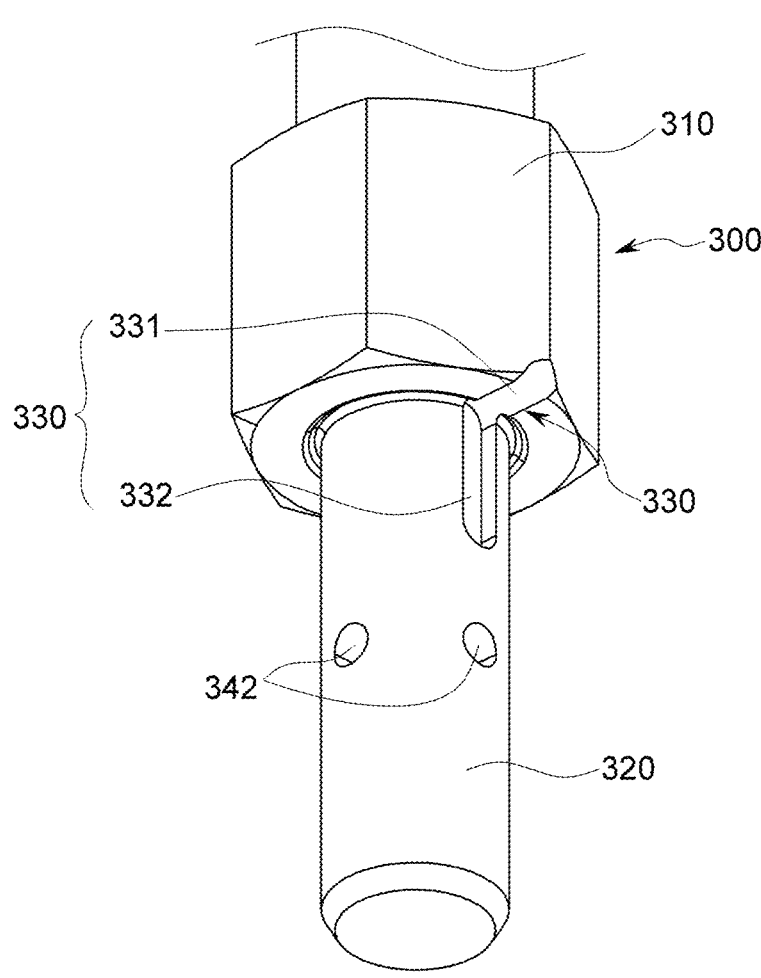
FIG. 2 is a perspective view illustrating a sub-piston rod of the frequency sensitive shock absorber according to one embodiment of the present disclosure.
Figure 3:
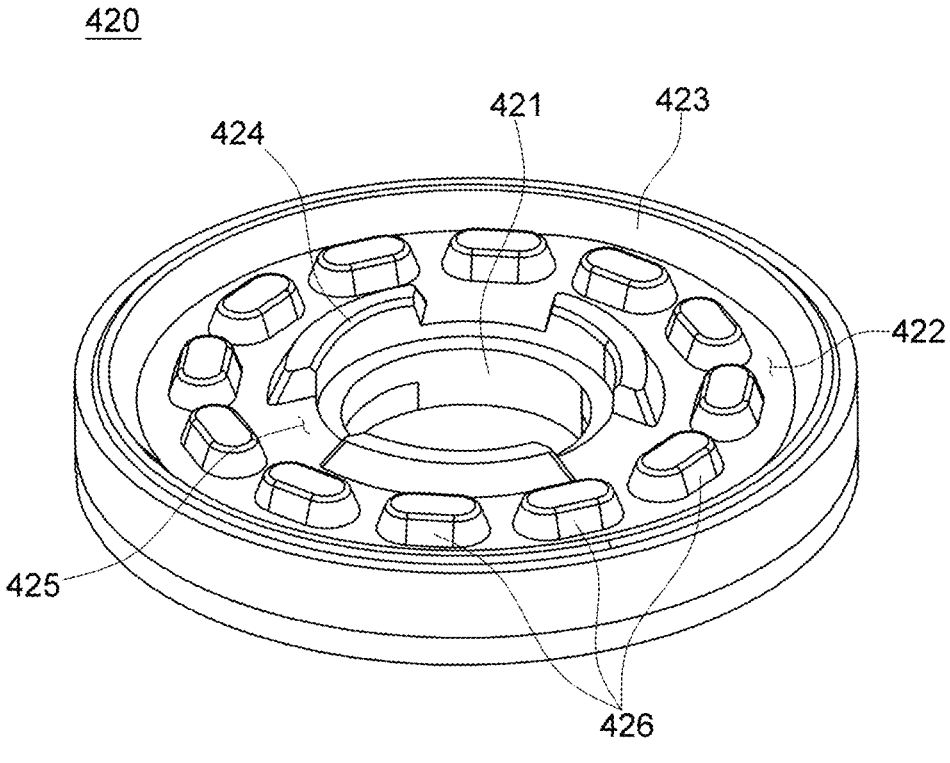
FIG. 3 is a perspective view illustrating a retainer of the frequency sensitive shock absorber according to one embodiment of the present disclosure.

Next, the sub-piston rod 300 will be described in more detail. The sub-piston rod 300 includes a head portion 310 and a rod body portion 320 as illustrated in FIG. 2. The head portion 310 is a portion coupled to the piston rod 100. The rod insertion groove 311 is formed in the head portion 310 by a set depth from the upper surface to the lower surface so that one side (lower side) of the piston rod 100 is inserted.

The rod body portion 320 is formed to extend along the longitudinal direction from the lower surface of the head portion 310. The rod body portion 320 is formed in a columnar shape. A second fluid flow path 340 is formed inside the rod body portion 320. The working fluid transferred from the first fluid flow path 110 of the piston rod 100 flows into the sub-valve module 400 through the second fluid flow path 340.

The second fluid flow path 340 includes a second longitudinal fluid flow path 341 and a second transverse fluid flow path 342. The second longitudinal fluid flow path 341 is formed from a lower surface of the rod insertion groove 311 by a predetermined depth along the longitudinal direction of the rod body portion 320. The second transverse fluid flow path 342 is formed to penetrate in a direction crossing the longitudinal direction of the rod body portion 320 at a position spaced apart from the lower surface of the rod insertion groove 311 by a set depth.

The second transverse fluid flow path 342 is in communication with the second longitudinal fluid flow path 341. After the working fluid is introduced through the second longitudinal fluid flow path 341 and flows into the second transverse fluid flow path 342, the working fluids is introduced into the sub-valve module 400 from the second transverse fluid flow path 342.

Meanwhile, the working fluid discharge path 330 is formed outside the sub-piston rod 300. Specifically, the working fluid discharge path 330 includes a first discharge path 331 and a second discharge path 332.

The first discharge path 331 is formed on a lower surface of the head portion 310. Specifically, the first discharge path 331 is concavely formed from the outside of the head portion 310 to the outer circumferential surface of the rod body portion 320 in a radial direction toward the center.

The second discharge path 332 is formed on an outer peripheral surface of the rod body portion 320. The second discharge path 332 is formed to be recessed by a predetermined length along the longitudinal direction of the rod body portion 320 on one side of the first discharge path 331, that is, at a point touching the outer circumferential surface of the rod body portion 320.

The first discharge path 331 and the second discharge path 332 are connected to each other, and one side of the second discharge path 332 is located inside the sub-valve module 400 coupled to the sub-piston rod 300. Therefore, the working fluid flows along the second discharge path 332 and the first discharge path 331 and is discharged.

The sub-valve module 400 is coupled to the rod body portion 320 of the sub-piston rod 300. Specifically, the rod body portion 320 is coupled to penetrate the sub-valve module 400. The sub-valve module 400 is interlocked with the sub-piston rod 300 to reciprocate. The sub-valve module 400 generates a damping force that is converted according to frequency, particularly during the tension stroke.

The sub-valve module 400 includes a housing 410, a retainer 420, a first pilot valve 430, a second pilot valve 440, an inlet disk 450, and an outlet disk 460.

The housing 410 is coupled to the rod body portion 320. Specifically, the rod body portion 320 is coupled to penetrate the housing 410. A first hollow 411 is formed in the housing 410 so as to pass through the rod body portion 320 in the center.

Pilot chambers 412 and 413 are formed at upper and lower sides of the housing 410 to be filled with the working fluid introduced through the second fluid flow path 340. Specifically, a first outer wall 414 protruding upward and downward and extending along the circumferential direction is formed on each edge of the upper and lower surfaces of one surface 410a on which the first hollow 411 is formed. Moreover, a first inner wall 415 protruding upward and downward from a position spaced apart from the first hollow 411 by a set distance in the radial direction on each of the upper and lower surfaces of the one surface 410a and extending along the circumferential direction is formed.

The pilot chambers 412 and 413 are formed between the first outer wall 414 and the first inner wall 415. An upper pilot chamber 412 is formed on the upper side of the one surface 410a between the first outer wall 414 and the first inner wall 415. A lower pilot chamber 413 is formed on the lower side of the one surface 410a between the first outer wall 414 and the first inner wall 415.

Meanwhile, when the housing 410 is coupled to the sub-piston rod 300, a separation space 416 is formed between the first inner wall 415 and the sub-piston rod 300. The working fluid flowing into the upper pilot chamber 412 also flows into the separation space 416, which will be described in detail later.

The retainer 420 is located on the lower side of the housing 410. The retainer 420 is coupled to the rod body portion 320 like the housing 410. The rod body portion 320 passes through the retainer 420 and is coupled to the retainer 420. Accordingly, a second hollow 421 through which the rod body portion 320 can pass is also formed in the retainer 420.

The retainer 420 includes a main chamber 422 which is formed to be filled with the working fluid introduced through the sub-piston rod 300. The retainer 420 includes an outer wall 423, an inner wall 424, and a protrusion 426.

On one surface of the retainer 420 facing the housing 410, the outer wall 423 protruding upwardly from the edge and extending along the circumferential direction is formed. The inner wall 424 is also formed on one surface facing the housing 410. The inner wall 424 protrudes at a position spaced apart from the second hollow 421 by a set distance in the radial direction on the one surface, and a plurality of inner walls 424 are spaced apart by a set angle along the circumferential direction of the second hollow 421. The main chamber 422 is formed between the outer wall 423 and the inner wall 424.

A flow path 425 is formed between the adjacent inner wall 424 and the inner wall 424 so that the working fluid discharged from the second fluid flow path 340 can flow into the main chamber 422. A pressure of the working fluid flowing into the main chamber 422 may be adjusted according to the number of the flow paths 425 and a cross-sectional area of the flow paths 425.

The protrusion 426 is formed in the main chamber 422. Specifically, the protrusion 426 protrudes from one surface of the retainer 420 on which the outer wall 423 and the inner wall 424 are formed, and a plurality of retainer 420 are formed to be spaced apart by a set angle along the circumferential direction of the retainer 420.

The first pilot valve 430 is located between the housing 410 and the retainer 420. The first pilot valve 430 is also coupled to the rod body portion 320. The first pilot valve 430 partitions between the lower pilot chamber 413 and the main chamber 422.

The first pilot valve 430 is formed of a rubber material or a synthetic resin material. Accordingly, the first pilot valve 430 may be elastically deformed by a pressure difference between the pilot chambers 412 and 413 and the main chamber 422.

The first pilot valve 430 is in contact with an upper end of the retainer 420 during the low-frequency tension stroke. Specifically, during the low-frequency tension stroke, the working fluid delivered from the sub-piston valve 300 is introduced into the pilot chambers 412 and 413 and the main chamber 422 to achieve pressure equilibrium. Accordingly, the first pilot valve 430 maintains contact with the upper end of the retainer 420. (Refer to FIG. 6)

Meanwhile, during the high-frequency tension stroke, a speed at which the working fluid is filled in the main chamber 422 is faster than a speed at which the working fluid is filled in the pilot chambers 412 and 413. Accordingly, the pressure of the main chamber 422 is higher than the pressure of the pilot chambers 412 and 413, and thus, the first pilot valve 430 is deformed to be spaced apart from the upper portion of the retainer 420 to open the main chamber 422.

The second pilot valve 440 is located between the head portion 310 and the housing 410. The second pilot valve 440 is also coupled to the rod body portion 320. The second pilot valve 440 shields the upper pilot chamber 412 and is elastically deformed according to a pressure change in the pilot chambers 412 and 413. The second pilot valve 440 is also formed of a rubber material or a synthetic resin material like the first pilot valve 430.

The second pilot valve 440 may be elastically deformed depending on a pressure according to an amount of the working fluid flowing into the pilot chambers 412 and 413.

Since the second pilot valve 440 can be elastically deformed, the volume of the pilot chambers 412 and 413 can be changed as the working fluid flows into the pilot chambers 412 and 413 during the high-frequency tension stroke. When the volume change of the pilot chamber 412 passes a critical point, a pressure drop occurs in the pilot chambers 412 and 413 instantaneously, and the pressure difference with the main chamber 422 increases. Accordingly, as described above, the opening of the main chamber 422 may be facilitated while the first pilot valve 430 is elastically deformed.

The inlet disk 450 is located between the housing 410 and the first pilot valve 430. The inlet disk 450 is also coupled to the rod body portion 320. The inlet disk 450 induces the working fluid flowing through the second fluid flow path 340 to be introduced into the lower pilot chamber 413.

When the inlet disk 450 is not provided between the housing 410 and the first pilot valve 430, a horizontal surface (not illustrated) of the first pilot valve 430 is in close contact with a lower end of the first inner wall 415 below the housing 410. In this case, the working fluid discharged through the second transverse fluid flow path 342 stays in only a separation space (not illustrated) between the sub-piston rod 300 and the first inner wall 415 below the housing 410 and does not flow into the pilot chambers 412 and 413.

A first slit (not illustrated) extending from the center in the radial direction of the inlet disk 450 is formed in the inlet disk 450. In the present embodiment, although the case in which one first slit (not illustrated) is formed is exemplified, but the present disclosure is not limited thereto. That is, a plurality of the first slits (not illustrated) may be formed to be spaced apart by a set angle along the circumferential direction of the inlet disk 450.

When the inlet disk 450 is located between the housing 410 and the first pilot valve 430, the second transverse fluid flow path 342 and the lower pilot chamber 413 communicate with each other by the first slit (not illustrated). Accordingly, the working fluid discharged through the second transverse fluid flow path 342 flows into the pilot chambers 412 and 413 through the first slit (not illustrated).

The outlet disk 460 is located between the housing 410 and the second pilot valve 440. The outlet disk 460 is coupled to the rod body portion 320. A second slit 461 extending from the center in the radial direction of the outlet disk 460 is formed in the outlet disk 460. In the present embodiment, the case where one second slit 461 is formed in the outlet disk 460 is exemplified, but the present disclosure is not limited thereto. That is, like the first slit (not illustrated), a plurality of second slits 461 may be formed to be spaced apart by a set angle along the circumferential direction of the outlet disk 460.

When the outlet disk 460 is not provided between the housing 410 and the second pilot valve 440, the horizontal surface 441 of the second pilot valve 440 is in close contact with the upper end of the first inner wall 415 above the housing 410.

The sub-valve module 400 should discharge the working fluid flowing into the pilot chambers 412 and 413 when the pressures of the pilot chambers 412 and 413 are continuously increased to prevent the pressures in the pilot chambers 412 and 413 from excessively increasing. However, as described above, when the upper end of the first inner wall 415 and the horizontal surface 441 of the second pilot valve 440 are in close contact with each other, it is difficult to discharge the working fluid.

Conventionally, a number of holes were formed in the horizontal surface of the second pilot valve. Therefore, even when a configuration such as the outlet disk of the present disclosure is not provided between the housing and the second pilot valve, when the pressures of the pilot chambers 412 and 413 increase, the working fluid is discharged through the hole to prevent the pressure increase.

However, since the horizontal plane of the second pilot valve is formed in the form of a thin plate, pressure concentration was generated around the hole when the working fluid was discharged through the hole, a pressure concentration is generated around the hole. This causes a decrease in durability of the second pilot valve, and thus, there is a problem that the horizontal surface of the second pilot valve is damaged.

In present embodiment, by providing the outlet disk 460 between the housing 410 and the second pilot valve 440, the upper pilot chamber 412 and the working fluid discharge path 330 communicate with each other to discharge the working fluid, and thus, it is possible to prevent the increase in the pressure, and easily adjust the pressures in the pilot chambers 412 and 413.

Figure 4:
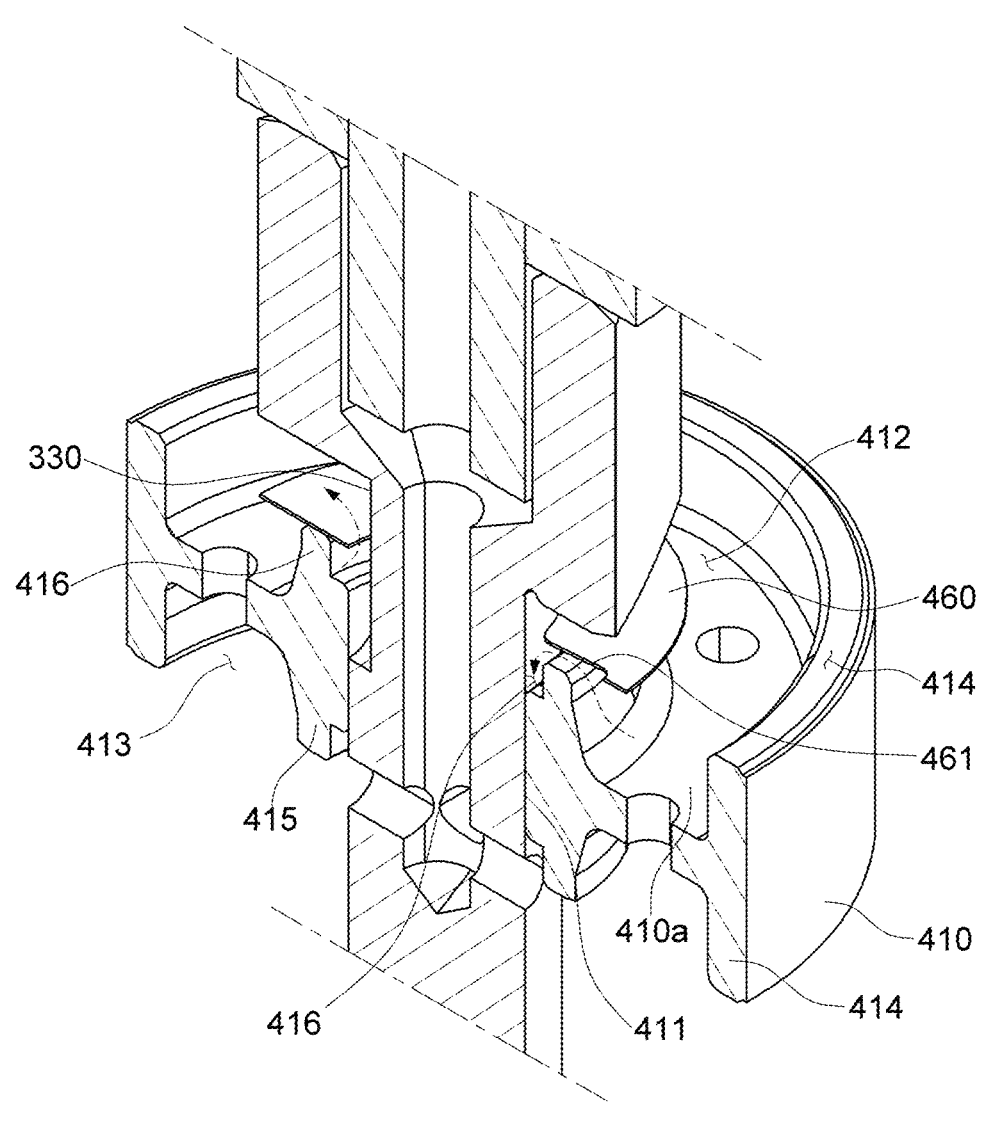
FIG. 4 is a partial cross-sectional perspective view of the frequency sensitive shock absorber according to one embodiment of the present disclosure.

Specifically, as illustrated in FIG. 4, the working fluid introduced into the upper pilot chamber 412 by the second slit 461 formed in the outlet disk 460 flows into the separation space 416 between the upper first inner wall 415 and sub-piston rod 300. Moreover, the working fluid is discharged to the compression chamber 11 through the working fluid discharge path 330 formed in the sub-piston rod 300.

By discharging the working fluid through the working fluid discharge path 330 without further forming the second slit 461 on the outlet disk 460, the pressures in the pilot chambers 412 and 413 can be easily adjusted by a slit area control effect on the outlet disk 460.

Since the sub-piston rod 300 is significantly thicker than the horizontal plane (not illustrated) of the second pilot valve 440, even when the pressure concentration by the working fluid occurs in the working fluid discharge path 330, the durability does not decrease or the sub-piston rod 330 is not damaged. Accordingly, the durability of the frequency sensitive shock absorber 1000 as well as the sub-valve module 400 can be improved.

Meanwhile, the sub-valve module 400 may further include a pilot disk (not illustrated). The pilot disk (not illustrated) is coupled to the rod body portion 320 and provided above the second pilot valve 440. The pilot disk (not illustrated) is in close contact with an upper side of a horizontal surface (not illustrated) of the second pilot valve 440 to support the second pilot valve 440.

The piston rod 100, the main valve 200, the sub-piston rod 300, and the sub-valve module 400 are firmly assembled by a spacer 20 and a washer 30. Referring FIG. 1, the spacer 20 and the washer 30 are provided between the piston rod 100 and the main valve 200 and between the sub-piston rod 300 and the sub-valve module 400.

A nut 40 is provided below the retainer 420 so that the retainer 420 is coupled to the sub-piston rod 300. The sub-valve module 400 may be firmly fixed by the nut 40 provided below the retainer 420.

An operating state of the frequency sensitive shock absorber 1000 as described above will be described with reference to FIGS. 5 to 8 as follows.

Figure 5:
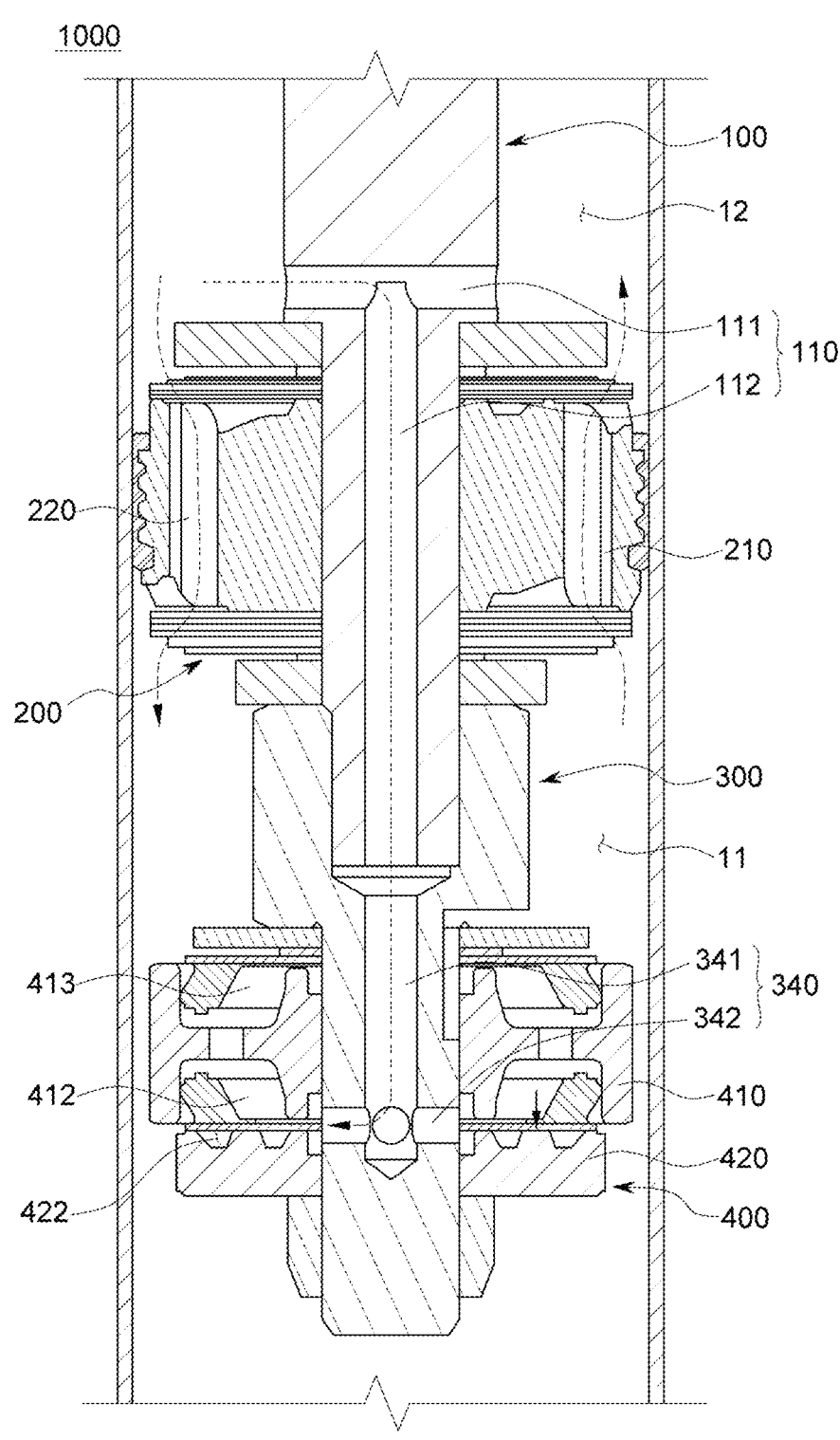
FIGS. 5 and 6 are cross-sectional views illustrating a flow of a working fluid during a low frequency stroke of the frequency sensitive shock absorber according to one embodiment of the present disclosure.
Figure 7:
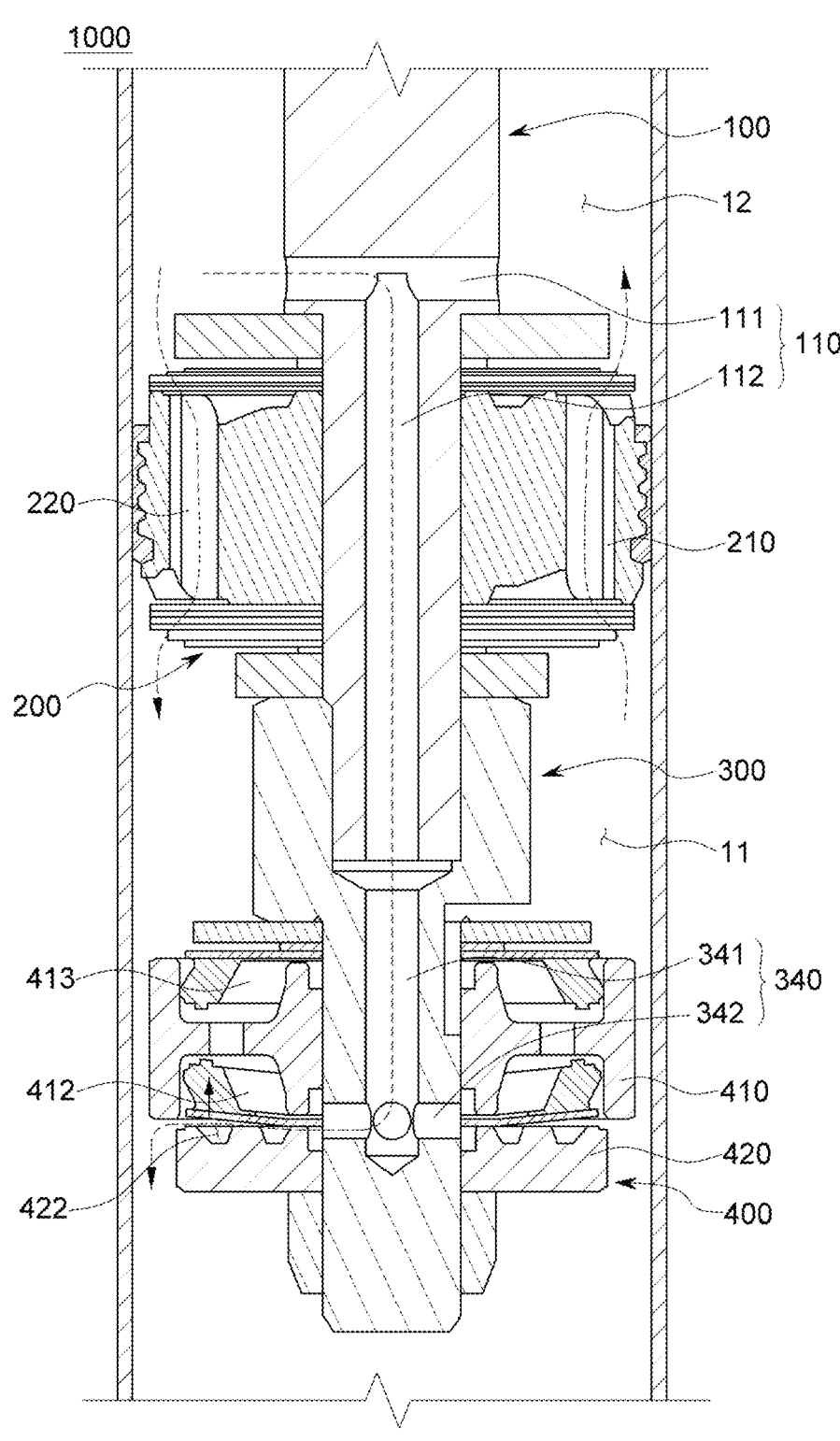
FIGS. 7 and 8 are cross-sectional views illustrating the flow of the working fluid during. a high frequency stroke of the frequency sensitive shock absorber according to one embodiment of the present disclosure.

First, when the frequency sensitive shock absorber 1000 performs the compression stroke, as illustrated in FIGS. 5 and 7, the working fluid filling the compression chamber 11 passes through the compression flow path 210 of the main valve 200 and flows into the tension chamber 12, and thus, the damping force is generated. Meanwhile, when the frequency sensitive shock absorber 1000 performs the tension stroke, the working fluid filling the tension chamber 12 passes through the tension flow path 220 of the main valve 200 and flows into the compression chamber 11, and thus, the damping force is generated.

Meanwhile, when the frequency sensitive shock absorber 1000 performs the low-frequency tension stroke, a damping force by the sub-valve module 400 is also generated separately from the damping force through the main valve 200.

Figure 6:
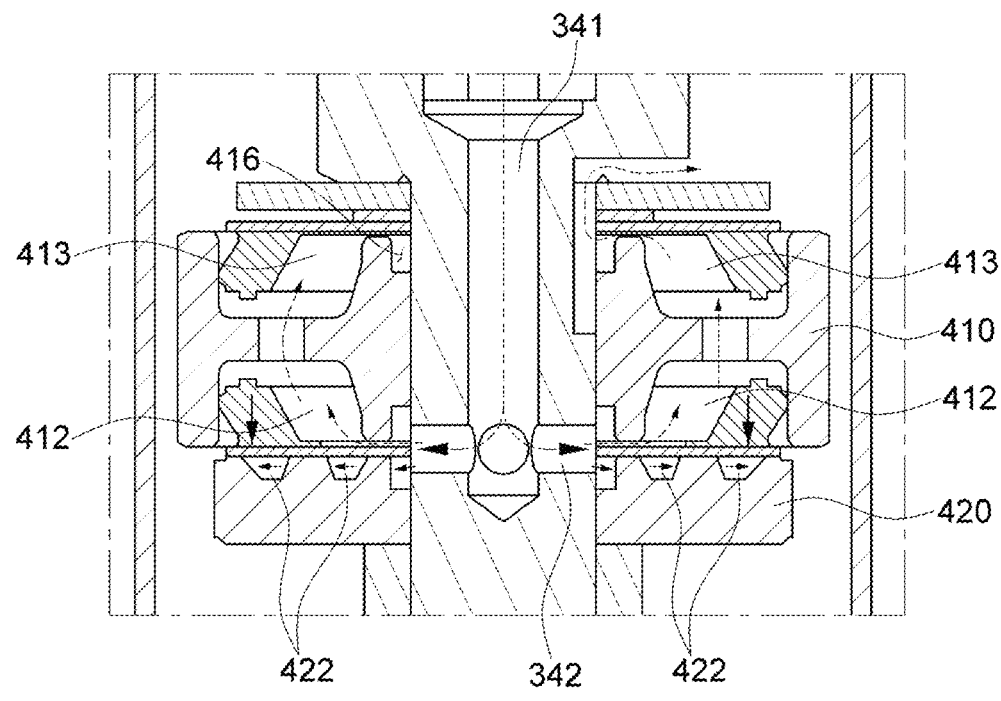

Specifically, referring to FIG. 6, the working fluid filling the tension chamber 12 is introduced into the first fluid flow path 110 of the piston rod 100, flows into the second fluid flow path 340 of the sub-piston rod 300, and is introduced into the pilot chambers 412 and 413 and the main chamber 422 of the sub-valve module 400.

A part of the working fluid is introduced into the main chamber 422 through the flow path 425 of the retainer 420. At the same time, the remaining part of the working fluid flows into the pilot chambers 412 and 413 through the first slit (not illustrated) of the inlet disk 450.

The low frequency is a large impact of vibration acting on the vehicle. Therefore, as the piston rod 100 and the sub-piston rod 300 operate at a low frequency, the working fluid can be smoothly introduced into the pilot chambers 412 and 413 through the first slot (not illustrated) of the inlet disk 450.

Accordingly, the pressures of the working fluid introduced into the pilot chambers 412 and 413 and the main chamber 422 are balanced, and the horizontal plane (not illustrated) of the first pilot valve 430 maintains contact with the upper end of the retainer 420 and the lower end of the housing 410.

When the working fluid is continuously introduced into the pilot chambers 412 and 413 and the inflow amount increases, the pressure also increases to a predetermined pressure or more. In this case, the working fluid introduced into the upper pilot chamber 413 through the second slit 461 of the outlet disk 460 flows into the separation space 416. The fluid flowing into the separation space 416 flows along the working fluid discharge path 330 and is discharged to the compression chamber 11, and thus, it is possible to prevent the pressure increase of the pilot chambers 412 and 413.

Meanwhile, when the frequency sensitive shock absorber 1000 performs a high-frequency tension stroke, the damping force by the sub-valve module 400 is changed separately from the damping force through the main valve 200.

Figure 8:
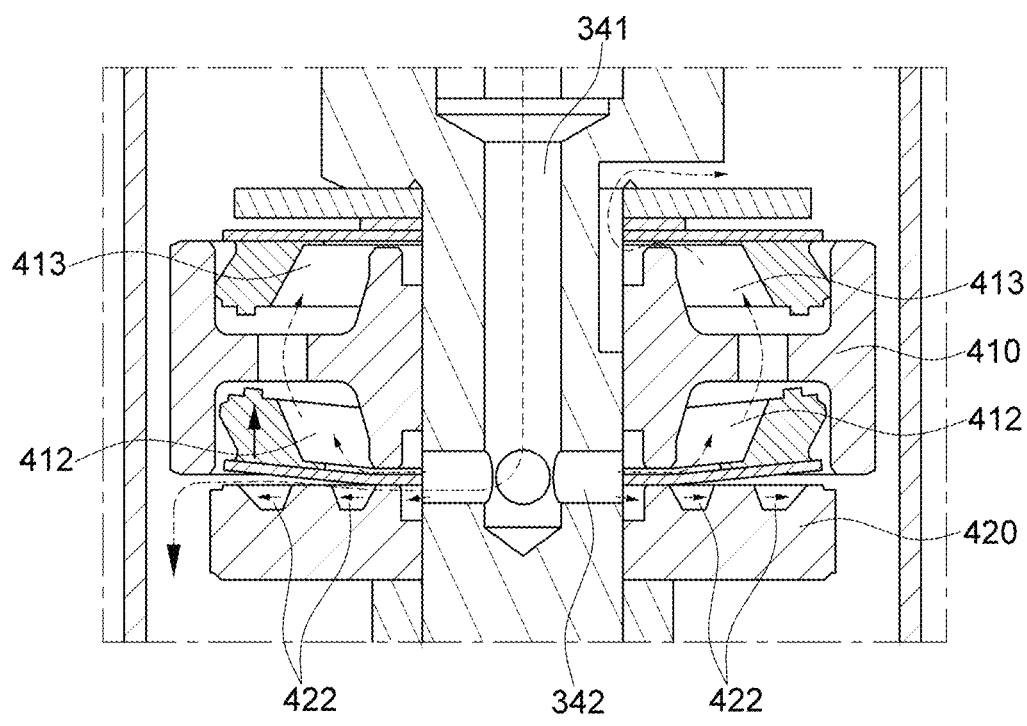

Specifically, referring specifically to FIG. 8, the working fluid filling the tension chamber 12 is introduced into the first fluid flow path 110 of the piston rod 100, flows into the second fluid flow path 340 of the sub-piston rod 300, and is introduced into the pilot chambers 412 and 413 and the main chamber 422 of the sub-valve module 400.

A prat of the working fluid is introduced into the main chamber 422 through the flow path 425 of the retainer 420. At the same time, the remaining part of the working fluid flows into the pilot chambers 412 and 413 through the first slit (not illustrated) of the inlet disk 450.

The high frequency is a small impact of small vibrations on the vehicle. Therefore, as the piston rod 100 and the sub-piston rod 300 operate at a high frequency, the second pilot valve 440 is deformed by the working fluid introduced through the first slot (not illustrated) of the inlet disk 450, the volumes of the pilot chambers 412 and 413 are changed, and pressure formation in the pilot chambers 412 and 413 is limited.

Meanwhile, since the main chamber 422 forms a pressure by the working fluid without the change in the volume, the main chamber 422 has a pressure imbalance in which the pressure is greater than the pressures of the pilot chambers 412 and 413.

Accordingly, the first piston valve 430 is elastically deformed, and the horizontal surface of the first piston valve 430 is spaced apart from the upper end of the retainer 420 to open the main chamber 422. Therefore, the working fluid introduced into the main chamber 422 flows into the pressure chamber 11, and as a result, the damping force is lowered compared to the low frequency stroke.

As described above, the frequency sensitive shock absorber provides an appropriate damping force according to low and high frequencies, thereby improving driving stability. In particular, in the case of a high-frequency tension stroke, it is possible to prevent the decrease in the damping force in the low-speed section, and thus, prevent decrease in handling performance. In addition, it is possible to improve driving stability by generating damping force reduction performance even in the middle and high speed section during the high frequency tension stroke.

In particular, since the discharge of the working fluid for preventing the pressure increase in the pilot chamber during the low-frequency tension stroke is made through the working fluid discharge path formed in the sub-piston rod, the effect of improving durability can be expected.

Although the embodiment of the present disclosure has been described above with reference to the accompanying drawings, those skilled in the art to which the present disclosure pertains can understand that the present disclosure may be embodied in other specific forms without changing the technical spirit or essential characteristics thereof.

Therefore, the embodiment described above is to be understood as illustrative and not restrictive in all respects, and the scope of the present disclosure is indicated by the following claims, and all changes or modifications derived from the meaning and scope of the claims and their equivalent concepts should be construed as being included in the scope of the present disclosure.

DETAILED DESCRIPTION OF MAIN ELEMENTS

| | |
|---|---|
| 1000: frequency sensitive shock absorber | |
| 10: cylinder | 11: compression chamber |
| 12: tension chamber | 20: spacer |
| 30: washer | 40: nut |
| 100: piston rod | 110: first fluid flow path |
| 111: first transverse fluid flow path | 112: first longitudinal fluid flow path |

-continued

| | |
|---|---|
| 200: main valve | 210: compression flow path |
| 220: tension flow path | 300: sub-piston rod |
| 310: head portion | 320: rod body portion |
| 330: working fluid discharge path | 331: first discharge path |
| 332: second discharge path | |
| 340: second fluid flow path | 341: second longitudinal fluid flow path |
| 342: second transverse fluid flow path | 400: sub-valve module |
| 410: housing | 411: first hollow |
| 412, 413: pilot chamber | 414: first outer wall |
| 415: first inner wall | 416: separation space |
| 420: retainer | 421: second hollow |
| 422: main chamber | 423: outer wall |
| 424: inner wall | 425: flow path |
| 426: protrusion | 430: first pilot valve |
| 440: second pilot valve | 450: inlet disk |
| 460: outlet disk | 461: second slit |

What is claimed is:

1. A frequency sensitive shock absorber comprising:
   a piston rod coupled so that one side is located inside a cylinder and the other side is located outside the cylinder;
   a main valve coupled to the piston rod and partitioning an inner space of the cylinder into a compression chamber and a tension chamber;
   a sub-piston rod coupled to one side of the piston rod and interlocked with the piston rod to reciprocate along a longitudinal direction of the cylinder; and
   a sub-valve module coupled to the sub-piston rod and generating a damping force according to a frequency during a tension stroke,
   wherein the sub piston rod includes a working fluid discharge path formed to communicate with an inside of the sub-valve module to discharge a working fluid to adjust a pressure inside the sub-valve module when the pressure inside the sub-valve module increases due to the working fluid flowing into the sub-valve module during the tension stroke at low frequency,
   wherein the sub piston rod includes
   a head portion coupled to one side of the piston rod and
   a rod body portion extending along a longitudinal direction of the rod body portion from a lower surface of the head portion and having a size of a cross section crossing the longitudinal direction of the rod body portion formed smaller than a size of a cross section of the head portion crossing the longitudinal direction of the head portion, and
   wherein the working fluid discharge path includes
   a first discharge path formed on the lower surface of the head portion and concavely formed from an external profile of the head portion to an outer circumferential surface of the rod body portion in a radial direction toward the rod body portion, and
   a second discharge path formed on the outer circumferential surface of the rod body portion and formed by a set length along the longitudinal direction of the rod body portion.

2. The frequency sensitive shock absorber of claim 1, wherein a rod insertion groove is formed in the head portion by a set depth from an upper surface to the lower surface so that one side of the piston rod is inserted into the head portion.

3. The frequency sensitive shock absorber of claim 1, wherein a first fluid flow path through which the working fluid filling the inner space of the cylinder is introduced, flowed and discharged is formed when compression and tension strokes are performed along the longitudinal direction of the cylinder is formed inside the piston rod.

4. The frequency sensitive shock absorber of claim 3, wherein a second fluid flow path through which the working fluid delivered from the piston rod is introduced, flowed, and discharged is formed inside the sub-piston rod.

5. The frequency sensitive shock absorber of claim 4, wherein the sub-valve module includes a housing coupled to the rod body portion and having pilot chambers formed at upper and lower sides to be filled with the working fluid introduced through the second fluid flow path, a retainer located at a lower side of the housing, coupled to the rod body portion, and having a main chamber to be filled with the working fluid introduced through the second fluid flow path, a first pilot valve located between the housing and the retainer, coupled to the rod body portion, and partitioning the pilot chamber and the main chamber, and a second pilot valve located between the head portion and the housing, coupled to the rod body portion, and elastically deformed according to a pressure change in the pilot chamber.

6. The frequency sensitive shock absorber of claim 5, wherein the sub-valve module further includes an inlet disk coupled to the rod body portion to be located between the housing and the first pilot valve and having one or a plurality of first slits for causing the second fluid flow path and the pilot chamber to communicate with each other.

7. The frequency sensitive shock absorber of claim 5, wherein the housing includes one surface of the housing in which a first hollow is formed, the first hollow extending in a longitudinal direction of the housing and allowing the rod body portion to penetrate, a first outer wall protruding upward and downward from an edge of the one surface of the housing and extending in a circumferential direction of the housing, and a first inner wall extending to protrude upward and downward at a position spaced apart in the radial direction from the first hollow on the one surface of the housing.

8. The frequency sensitive shock absorber of claim 7, wherein a separation space is formed between the sub-piston rod and the upper first inner wall when the housing is coupled to the sub-piston rod.

9. The frequency sensitive shock absorber of claim 8, wherein the sub-valve module further includes an outlet disk coupled to the rod body portion to be located between the housing and the second pilot valve and having one or a plurality of second slits for causing the working fluid discharge path, the separation space, and the upper pilot chamber to communicate with each other.

10. The frequency sensitive shock absorber of claim 5, wherein a hollow through which the sub-piston rod passes is formed in the retainer, wherein the retainer includes an outer wall protruding upwardly from an edge of one surface of the retainer facing the housing and extending in a circumferential direction of the retainer, and inner walls formed to protrude and to be spaced apart by a set angle along a circumferential direction of the hollow at a position spaced apart from the hollow in the radial direction on the one surface of the retainer facing the housing, and wherein the main chamber is formed between the outer wall and the inner walls.

11. The frequency sensitive shock absorber of claim 10, wherein the retainer further includes a plurality of protrusions formed to protrude and to be spaced apart by a set angle along the circumferential direction of the retainer on the one surface of the retainer to be located inside the main chamber.

12. The frequency sensitive shock absorber of claim 10, wherein a flow path is formed between one inner wall and an adjacent inner wall so that the working fluid is introduced into the main chamber.

* * * * *